July 13, 1965    A. BRUEDER    3,194,581
ANTI-ROLL DEVICES FOR AUTOMOBILE VEHICLES
Filed March 14, 1963    2 Sheets-Sheet 1
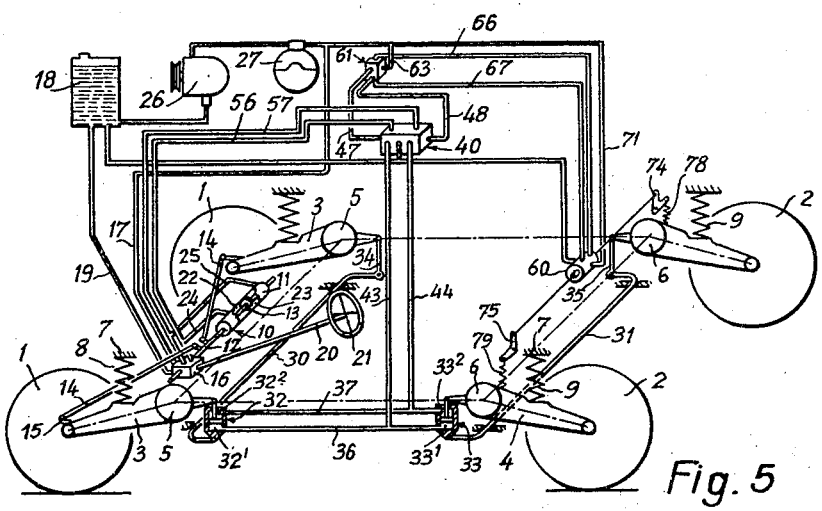
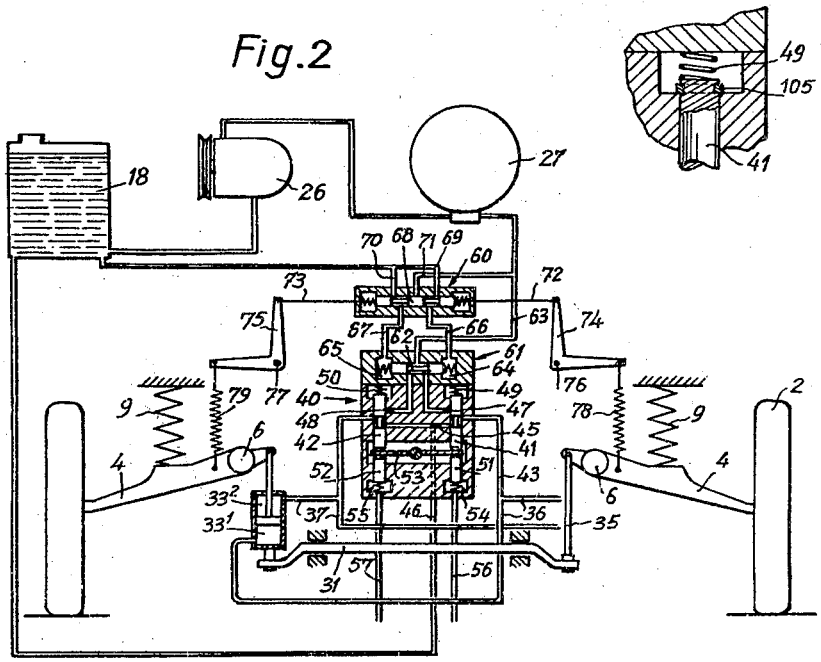
Inventor
Antoine Brueder
By
Wenderoth, Lind & Ponack
Attorneys Inventor
Antoine Brueder
By
Wenderoth, Lind & Ponack
Attorneys United States Patent Office 3,194,581
Patented July 13, 1965

3,194,581
ANTI-ROLL DEVICES FOR AUTOMOBILE
VEHICLES
Antoine Brueder, Paris, France, assignor to Societe Anonyme André Citröen, Paris, France, a corporation of France
Filed Mar. 14, 1963, Ser. No. 265,273
Claims priority, application France, Mar. 15, 1962, 891,242, Patent 1,325,058
5 Claims. (Cl. 280—112)

This invention relates to an anti-roll suspension device for automobile vehicles which is designed primarily for counteracting the action of centrifugal force on the vehicle body when cornering to permit the inclination of the vehicle body on the near wheels as desirable—instead of on the outer wheels, as usual.

Various means have already been proposed for achieving this result, but so far they did not prove satisfactory since their response time was practically zero both to centrifugal-force sensing means and to the incipient transverse inclination of the vehicle. Exhaustive study and tests led the applicants to conclude that to be successful such a device should meet the following requirements:

The anti-roll device should become operative before the centrifugal force is created, and, preferably, its action antagonistic to the centrifugal force should cease before this force has dropped completely to zero.

The vehicle body must lean inwardly of the turn being negotiated, but this inclination should be limited to preserve a sufficient possibility of wheel beat with respect to the suspension system. There is not inconvenience in predetermining this inclination so that it remains invariable irrespective of the radius of curvature of the bend and the velocity of the vehicle.

Preferably, the speed at which the vehicle body is set in an inclined position should be a function of the rate at which the radius of curvature changes along the path followed by the vehicle.

It is the essential object of this invention to provide an anti-roll device capable of meeting these requirements, especially the first one considered as the most important condition, this device comprising, in the vehicle suspension system, pressure-fluid receiving members for correcting the trim of the vehicle and a distributor connected to said member and responsive to the steering control in order selectively to distribute fluid under pressure to said receiving members according to the direction in which the control action is exerted on the steering wheel, with a view to produce a transverse inclination of the vehicle body on the side corresponding to the direction in which the steering wheel has been turned. Moreover, in order to meet as much as possible the second requirement set forth hereinabove, the aforesaid distributor is responsive to an auxiliary distributing device controlled by means responsive in turn to the transverse inclination of the vehicle body and adapted to discontinue the delivery of fluid under pressure to said distributor when a predetermined degree of inclination of the vehicle body has been attained.

The fact that this device is responsive to the direction in which the steering is actuated meets more particularly the first requirement set forth hereinabove, in that there is always a certain time lag between the moment the driver exerts the steering effort and the moment the vehicle is actually subjected to the centrifugal force.

In this respect it may be emphasized that a virtual inclination of the vehicle body on the near wheels or inwards of a turn, which takes place slightly in advance on the turn proper, is not attended by any appreciable inconvenience, and that the same applies when the normal trim of the vehicle body is restored before the vehicle has actually completed its turn, whereas in either case a time lag would no doubt constitute an inconvenience.

The third requirement is obviously met provided that the variation in the cross-sectional passage area available for the pressure fluid delivered by the distributor is consistent with the quickness with which the driver actuates the steering control governing this distributor.

The direction in which the steering control effort is applied and even the magnitude of this effort can be sensed in various manners, but a particularly convenient method of sensing these parameters consists in utilizing the pressure values occurring in a servo-action steering control device, notably the values of the specific pressures built up in the chambers of the servo-assisted steering control mechanism; in this case, the distributor is responsive to these pressure values.

According to a specific form of embodiment of the anti-roll device of this invention, the aforesaid receiving members consist of hydraulic cylinders interposed, on at least one side of the vehicle, between the elements carrying the road wheels of the vehicle and the lever arms of front and rear torsion bars mounted in the fashion of stabilizing bars.

However, it should be understood that the term "pressure-fluid receiving members" designates as well any elements forming part of an existing suspension system, whether in the form of correcting hydraulic cylinders or pneumatic members acting themselves as suspension members.

Typical forms of embodiment of the anti-roll device of this invention will now be described with reference to the accompanying drawings illustrating diagrammatically by way of example the manner in which the invention may be carried out in practice, it being understood that changes in the precise embodiment of the invention herein disclosed may be made within the scope of what is claimed without departing from the spirit of the invention.

Other objects and advantages will become apparent from the following description taken in conjunction with the accompanying drawings, in which:

FIGURE 1 is a very diagrammatic view showing an assembly comprising the two trains of road wheels of an automobile vehicle equipped with a conventional spring-type suspension system and provided with the anti-roll device of this invention;

FIGURE 2 is a diagrammatic view showing more particularly the anti-roll device with the details concerning its hydraulic control system together with the manner in which it is associated with a rear train of road wheels, as seen from the rear;

FIGURE 5 is a partial cross-sectional and elevational view of a stop member associated with a valve.

Figure 3:
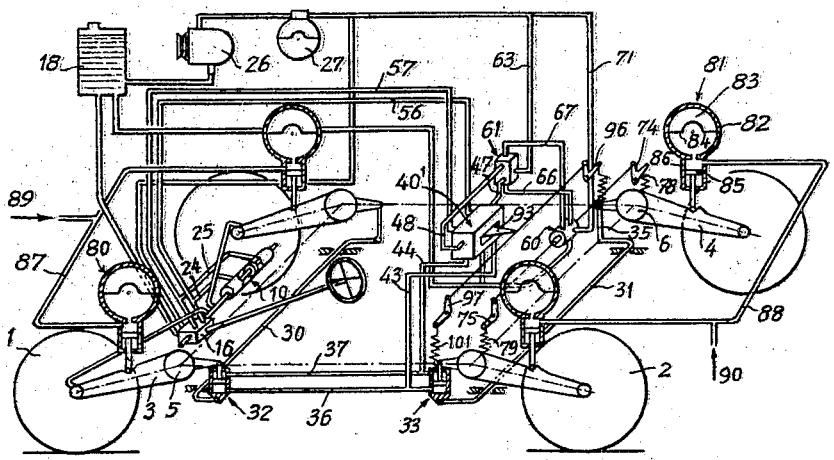
FIGURE 3 is a view similar to FIG. 1 but illustrating the two trains of road wheels of an automobile vehicle equipped with a hydropneumatic suspension system provided with the anti-roll of this invention.

The vehicle partially shown in FIG. 1 comprises a front train of road wheels 1 and a rear train of road wheels 2, mounted on the outer or free ends of swinging or carrier arms 3, 4 pivoted at 5 and 6 on the vehicle body shown only in diagrammatic form at 7, front and rear suspension springs 8, 9, respectively, being mounted between said arms and said vehicle body, as shown.

In this example the front wheels 1 are controlled by a servo-action steering system of any suitable and known design, which has been illustrated just to the extent necessary for the proper understanding of the invention. This servo steering comprises a hydraulic device 10 of which the cylinder 11 is secured on the vehicle body, the rod 12 of piston 13 slidably mounted in said cylinder 11 emerging from the latter and having its outer end connected through a linkage 14 to the steering arms 15 of wheels 1. It further comprises a distributor unit shown diagrammatically at 16 and connected to a source of fluid under pressure through a pipe line 17 and to the reservoir 18 of the hydraulic system through another pipe line 19. This unit 16 controlled by means of the steering column 20 carrying the steering wheel 21 is adapted, according to the direction in which the steering wheel 21 is rotated, to deliver fluid under pressure into either of chambers 22 or 23 of cylinder 11 through the relevant line 24 or 25 while connecting the other chamber to the exhaust, so that the hydraulic device 10 will transmit to the front wheels a movement setting them in the proper angular position as a function of the angular extent to which the steering wheel 21 has been rotated.

The source of fluid under pressure of the system consists of a pump 26 connected to the aforesaid reservoir 18 and having associated therewith as already known per se a pressure accumulator 27.

In this form of embodiment, the anti-roll device designed for inclining the vehicle body inwards when negotiating a curve consists of front and rear transverse torsion bars 30, 31 respectively, which are mounted for free rotation on the vehicle frame structure in the fashion of stabilizing bars and have their end lever arms connected to the front and rear wheel carrier arms 3, 4, respectively, through means comprising hydraulic-cylinder devices. In this case a front hydraulic device 32 and a rear hydraulic device 33 are provided, both of which being of the double-acting type and disposed on the same side of the vehicle, the connection between the torsion bars and the wheel carrier arms being simple through links 34, 35 on the other side of the vehicle. The cylinders of the hydraulic devices 32, 33 are pivotally connected to the end arm of the relevant torsion bar 30, 31 and the piston rods of these cylinders are connected to the corresponding wheel carrier arm 3, 4. The lower chambers $32^1$, $33^1$ of these hydraulic cylinders communicate with each other through a pipe line 36, and their upper chambers $32^2$, $33^2$ communicate with each other through another pipe line 37. The delivery of fluid under pressure to either of these chambers of cylinders 32, 33 will thus permit of tightening the torsion bars and therefore creating a torque reacting to the rolling torque developed by the centrifugal force when the vehicle is negotiating a turn.

This action is controlled through the medium of a distributor 40 responsive to the steering control, in this case under the control of the pressure developed in either of the two chambers of the hydraulic device 10 of the servo steering system.

The distributor 40 (FIG. 2) comprises two slide valves 41, 42 normally connecting lines 43, 44 (connected respectively to the interconnecting lines 36, 37 of cylinders 32, 33) with a duct 45 connected in turn through a line 46 to the fluid reservoir 18. These slide valves are also adapted to connect the pipe lines 43, 44 with ducts 47, 48 through which the pressure fluid is fed to the distributor. These slide valves 41, 42 are normally urged to the position shown in FIG. 2 by the antagonistic action of springs 49, 50 and spring-loaded push-rods 51, 52 co-acting with the relevant ends of slide valves 41, 42 through a rocking lever 53 pivoted therebetween in the distributor body. Moreover, these push-rods 51, 52 constitute hydraulically controlled pistons having their control chamber 54, 55 connected through pipe lines 56, 57 to the lines 24, 25 leading to the chambers of the hydraulic device 10 of the servo steering mechanism. It may be noted that adequate steps are taken in this example whereby, when one slide valve is actuated by the corresponding hydraulic push-rod, the connection between the cylinders and the reservoir is still maintained through the other slide valve; this feature may be obtained simply with the assistance of a stop member shown in FIGURE 5 in the form of an annular ring of abutment 105 engaged elastically in a corresponding groove of the slide valve limiting the downward movement of the slide valve 41. Moreover, the distributor 40 is responsive to a device sensing the transverse inclination of the vehicle body for controlling the delivery of pressure fluid to this distributor. The rocking lever 53 takes care of only operating a single valve at one time, either 41 or 42, and the corresponding valve of the pushers 51 or 52 upon which is applied the strongest pressure prevailing in the working chamber corresponding to the screw of the servo-direction.

This transverse inclination sensing device comprises an auxiliary distribution device constituted by a pilot distributor 60 co-acting with a relay valve 61 comprising in turn a slide valve member 62 normally positioned to connect the inlet ducts 47 and 48 of distributor 40 with a pipe line 63 connected to the source of fluid under pressure. This slide valve member 62 is urged to its normal position shown in the drawing by antagonistic springs housed in control chambers 64, 65 disposed at either end of the slide valve and connected through pipe lines 66, 67 to the pilot distributor 60. The latter comprises a twin type slide valve 68 adapted, in the normal position shown in the drawing, to connect the lines 66, 67 with the lines 69, 70 connected in turn to the reservoir 18, and to be moved either way from this position to a position in which one of the pipe lines 66 or 67 is connected to a line 71 connected to the source of fluid under pressure, while leaving the other line 66 or 67 connected with the reservoir 18, at least during the actuation of the slide valve 62 of the relay valve device which results from this distribution. The displacements of the twin valve 68 are controlled mechanically according to the transverse inclination of the vehicle through a resilient device connecting the slide valve to the arms of the rear wheels and comprising, at the ends of this slide valve, two cables or rods 72, 73 connected to bell-crank levers 74, 75 pivoted at 76, 77 on the vehicle body and connected on the other hand to traction springs 78, 79 attached at a point of the wheel arms 4 which is somewhat spaced from their pivot pin. This assembly is balanced with a view to keep the slide valve 68 in its intermediate position when the vehicle body is not leaning transversely with respect to the ground.

This anti-roll device operates as follows:

Assuming that the vehicle is on a straight course and about to negotiate a turn, in this case a right-hand turn, when the driver rotates the steering wheel 21 the distributor unit 16 of the servo-steering system delivers fluid under pressure into chamber 22 of steering cylinder 10 through a line 24, and even before the front road wheels have started their angular movement the fluid pressure thus available simultaneously in line 56 and chamber 54 actuates the push-rod 51 controlling the slide valve 41 of distributor 40.

The slide valve 41 actuated immediately causes the pressure-fluid inlet duct 47 to communicate with the pipe line 43 leading to the line 36 interconnecting the lower chambers of the hydraulic cylinders 32, 33 having their upper chambers connected to the exhaust. The delivery of fluid under pressure to the lower chambers of cylinders 32, 33 causes these devices to expand so that they exert an upward thrust on the left-hand wheel-carrier arms 3, 4 while reacting on the corresponding lever arms of torsion bars 30, 31 of which the right-hand lever arms, on the other hand, exert a downward traction, through the links 34, 35, on the right-hand wheel carrier arms 3, 4, so that the body of the vehicle will lean transversely to the right, that is, on the near or inner wheels with respect to the turning direction, against the effect produced by the centrifugal force when the turn has actually commenced.

This transverse inclination movement of the body tends to tension the spring 79 and to expand the spring 78 of the system controlling the twin slide valve 68 of pilot distributor 60, so that in this case slide valve 68 will move to the left as seen in FIG. 2, and that for a predetermined transverse inclination of the vehicle body this slide valve will cause the pressure-fluid line 71 to communicate with the line 66 controlling the relay valve 61. The slide valve member 62 of this relay valve is therefore moved instantaneously to the left as seen in FIG. 2 and the previously established communication between the pressure-fluid duct 63 and the inlet duct 47 of distributor 40 is discontinued, whereby the expansion of hydraulic devices 32 and 33 is also discontinued, the vehicle preserving the transverse inclination thus attained as long as a pressure capable of steering the front wheels to the right prevails in chamber 22 of the servo steering control device. The rapidity with which the slide valves 41, 42 open, and therefore the rapidity of response of the device proper, can be adjusted by altering the force of springs 49, 50 resisting the push-rod movements. At the end of a turn, as the steering wheel is rotated by the driver to resume a straight-ahead course, the pressure drops in chamber 22 of the servo steering cylinder which is connected to the exhaust, as well as in the chamber controlling the push-rod 51, so that the slide valve 41 of distributor 40 resumes its normal position (FIG. 2) in which it permits the discharge of the lower chambers of cylinders 32, 33 by connecting the line 43 to duct 45 communicating with the reservoir.

When during this return to the straight-ahead drive the pressure distribution is reversed in the servo steering device 10, the slide valve 42 of distributor 40 is actuated by its hydraulic push-rod 52, the rocking lever 53 pushing if necessary the push-rod 51 to free the slide valve 41, and slide valve 42 causes the upper chambers of cylinders 32, 33 to communicate with the inlet duct 48 of the distributor still connected with the pressure-fluid duct 63, this action occurring in the direction to restore the normal trim of the vehicle.

While the vehicle body resumes its normal trim due to the return to the straight ahead position, the twin slide valve 68 of pilot distributor 60 resumes its initial, intermediate position and allows the slide valve member of relay valve 61 to resume its inoperative position by restoring the connection between line 66 and line 69 connected with the fluid reservoir 18.

The above-described operation is exactly reversed in case of a left-hand turn.

Figure 4:
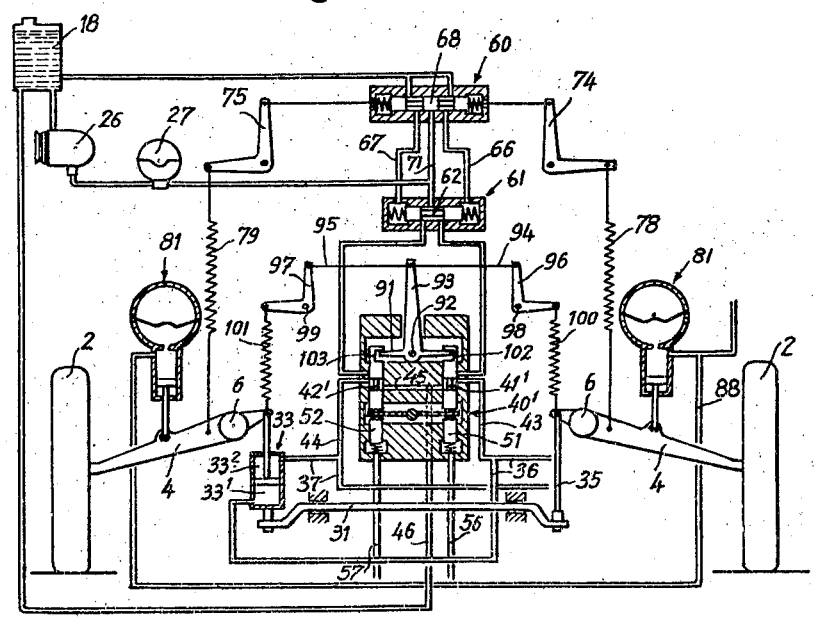
FIGURE 4 is a view similar to FIG. 2, showing more particularly details of hydraulic control means for the anti-roll device together with the manner in which it is associated with a rear train of road wheels, as seen from the rear.

FIGS. 3 and 4 illustrate a typical application of the anti-roll device of this invention similar to the device described hereinabove to a vehicle equipped with a hydropneumatic suspension system of known design, wherein a hydraulic interconnection is provided between the suspension units of each train of wheels, this arrangement being broadly explained hereinafter:

The suspension units designated by the reference numerals 80 and 81 for the front and rear trains of wheels respectively consist each of a hollow sphere 82 divided by a flexible diaphragm 84 into an upper chamber 83 filled with gas acting as a suspension spring and a lower liquid-filled chamber bounded on the other hand by a piston 85 slidably fitted in a cylinder 86 at the bottom of the sphere 82, this cylinder being on the other hand secured on the vehicle body, the rod of piston 85 bearing on the relevant wheel carrier arm.

The cylinders of the front and rear suspension unit 80 and 81 respectively communicate through pipe lines 87, 88 connected each at 89 and 90 to a pressure-fluid distributor (not shown) acting, as already known per se, as a device for correcting the vertical trim of the vehicle body.

This arrangement illustrated in FIGS. 3 and 4 of the drawings is on the other hand similar to that of FIGS. 1 and 2, except for the fact that the distributor $40^1$ corresponding to distributor 40 of the first form of embodiment is controlled by complementary means, whereby all the elements of FIGS. 3 and 4 which are similar to those of FIGS. 1 and 2 are simply designated by the same reference numerals in FIGS. 3 and 4.

In this arrangement, considering the interconnection between the two hydropneumatic suspension units and the absence of hydraulic pressure in the cylinders 32, 33 when the vehicle is driven straight ahead, the anti-roll device must necessarily be completed by a stabilizer in the straight ahead position. This stabilization is obtained with the assistance of the aforesaid complementary control of distributor $40^1$.

This complementary control consists of a resilient mechanical connection interposed between the slide valves $41^1$ and $42^1$ of distributor $40^1$, on the one hand, the rear wheel carrier arms 4, on the other hand.

It comprises a rocking lever 91 co-acting with said slide valves and pivoted at 92 in the distributor body, and comprising a control lever 83 connected through cable or rods 94, 95 to bell-crank levers 96, 97 pivoted at 98, 99 on the body of the vehicle and connected on the other hand to traction springs 100, 101 anchored at one point of the wheel carrier arms 4 which is spaced from their pivot axis. The rocking lever 91 co-acts with said slide valves $41^1$, $42^1$ by unidirectional engagement, so as to actuate only one of them at a time in the direction to change the pressure-fluid distribution, the outer ends of the arms of said rocking lever engaging notches 102, 103 formed in the slide valves, said arms being thus allowed a certain unidirectional free beat.

This trim correction control arrangement operates as follows:

Assuming that the body of the vehicle tends to lean on the right-hand side, or, otherwise stated, that the pivot pin of the right-hand wheel carrier arm is lowered with respect to that of the left-hand wheel carrier arm, the angular movement of the right-hand arm will tension the spring 100 while the movement of the left-hand arm will expand the other spring 101, so that the lever 93 controlling the rocking lever 91 will move to the right-hand side of the vehicle. Therefore, the rocker lever 91 will actuate the slide valve $42^1$ of distributor $40^1$ and thus connect the pressure-fluid inlet duct 48 with the pipe line 44, that is, with the line 37 interconnecting the upper chambers of cylinders 32, 33 of which the lower chambers remain connected to the exhaust through the non-actuated slide valve $41^1$. Thus, both hydraulic devices 32, 33 contract and apply to the wheel carrier arms through the torsion bars 30, 32 and links 34, 35 a torque tending to restore the vehicle body to its normal position, that is, to urge the pivot pin of the left-hand arm downwardly and the pivot pin of the right-hand arm upwardly. Of course, the reverse correction is effected when the body tends to lean on the left-hand side.

However, it should be noted that the hydraulic control of slide valves $41^1$, $42^1$ through push-rods 51, 52 is designed ot be preponderant with respect to this complementary control, so that, when the vehicle is cornering, the inclination of the vehicle body which results from the steering control be released and maintained through the medium of said push-rods, the actuated slide valve then neutralizing the action of rocker 91 by holding same in an inoperative or passive position against the action of springs 100, 101 of its resilient control. Thus, for instance, in the case of a right-hand turn, the slide valve $41^1$ actuated by the hydraulic push-rod 56 to cause the vehicle body to lean on the right-hand side, as described hereinabove, will neutralize the tendency of rocker 91 to move to the right and prevent the operation—at this time undesirable—of slide valve $42^1$.

Of course, the use of this complementary trim correction control should not be construed as being limited to the case of hydropneumatic suspension systems of the type described hereinabove and illustrated in the accompanying drawings, as this complementary control is applicable notably to any high-flexibility suspension system, irrespective of the type of spring or resilient means incorporated in the system.

I claim:

1. Anti-roll device for an automobile vehicle having a suspension system comprising fluid-pressure receiving members to correct the trim of the vehicle, servo steering control means having a servo steering distributor and a servo steering control cylinder with two chambers connected to the latter, a pressure fluid distributor connected to said members and responsive to said servo steering control means to selectively distribute, in response to the direction in which the steering wheel is actuated, fluid under pressure to said receiving members to cause the vehicle body to lean transversely on the side corresponding to the direction in which the steering wheel has been actuated, said distributor being actuated selectively by means of fluid under pressure from said servo steering control means, the selective control of said pressure fluid distributor being responsive to the pressures prevailing in said two chambers of the servo steering control cylinder, a transverse inclination sensing device comprising an auxiliary distributing device, said auxiliary distributing device cooperating with said pressure fluid distributor to discontinue the delivery of fluid under pressure to said distributor when a predetermined transverse inclination of the vehicle body is attained.

2. Anti-roll device according to claim 1 wherein said receiving members comprise hydraulic cylinder devices interposed at one side of the vehicle between the members carrying the road wheels of the vehicle and the lever arms of the front and rear torsion bars mounted as stabilizing bars.

3. Anti-roll device according to claim 1, wherein said pressure fluid distributor is responsive to a complementary control device responsive to the transverse inclination of the vehicle body and monitoring the distribution of fluid under pressure to said receiving members in the direction tending to neutralize any transverse inclination of the vehicle body, said pressure fluid distributor having control means on which the action of said servo steering control means is preponderant with respect to that of said complementary control device for selectively distributing fluid under pressure to said receiving members.

4. Anti-roll device according to claim 1 wherein said pressure fluid distributor comprises two slide valves to carry out said selective distribution of fluid under pressure, a rocker interposed between said slide valves and responsive, for each slide valve, to a control push-rod, said push-rod being actuated through the medium of fluid under pressure from the servo steering distributor.

5. Anti-roll device according to claim 1 wherein said pressure fluid distributor comprises two slide valves for carrying out said selective pressure-fluid distributions, a pressure-fluid inlet duct for each of said slide valves, said auxiliary distribution device comprising a pilot distributor responsive to the control means sensing the vehicle body inclination, and a pressure-fluid control relay valve responsive to said pilot distributor to block either of said inlet ducts when the aforesaid predetermined inclination is attained.

References Cited by the Examiner

UNITED STATES PATENTS 2,802,674   8/57   Jackson _____ 180—79.2

A. HARRY LEVY, *Primary Examiner.*

LEO FRIAGLIA, *Examiner.*